(12) United States Patent
Fischer

(10) Patent No.: US 7,313,950 B2
(45) Date of Patent: Jan. 1, 2008

(54) INTEGRATED MULTISENSOR

(75) Inventor: Harald Fischer, Bad-Ems (DE)

(73) Assignee: Atmel Germany GmbH, Heilbronn (DE)

( * ) Notice: Subject to any disclaimer, the term of this patent is extended or adjusted under 35 U.S.C. 154(b) by 98 days.

(21) Appl. No.: 11/346,172

(22) Filed: Feb. 3, 2006

(65) Prior Publication Data

US 2006/0174700 A1 Aug. 10, 2006

(30) Foreign Application Priority Data

Feb. 5, 2005 (DE) .................... 10 2005 005 350

(51) Int. Cl.
*G01M 15/00* (2006.01)

(52) U.S. Cl. .................................................. 73/119 A

(58) Field of Classification Search ................. 73/116, 73/117.2, 117.3, 118.1, 119 A, 119 R
See application file for complete search history.

(56) References Cited

U.S. PATENT DOCUMENTS

| 5,354,695 A | 10/1994 | Leedy |
| 2005/0199071 A1* | 9/2005 | Ganapathi ..................... 73/754 |

FOREIGN PATENT DOCUMENTS

| DE | 29 34 073 A1 | 7/1981 |
| WO | WO 2005/003801 A2 | 1/2005 |

* cited by examiner

*Primary Examiner*—Eric S. McCall
(74) *Attorney, Agent, or Firm*—MG-IP Law, PLLC

(57) ABSTRACT

An integrated multisensor, in particular for use in an internal combustion engine of a motor vehicle is provided. The multisensor includes at least one pressure/temperature sensor, at least one magnetic field sensor, and a plurality of insulating wells, wherein a separate insulating well encloses each pressure/temperature sensor or magnetic field sensor such that the sensors are each electrically and mechanically decoupled from one another.

19 Claims, 2 Drawing Sheets

INTEGRATED MULTISENSOR

This nonprovisional application claims priority under 35 U.S.C. § 119(a) on German Patent Application No. DE 102005005350, which was filed in Germany on Feb. 5, 2005, and which is herein incorporated by reference.

BACKGROUND OF THE INVENTION

1. Field of the Invention

The present invention relates to an integrated multisensor, in particular for an internal combustion engine of a motor vehicle.

2. Description of the Background Art

The technical field of the invention relates to the simultaneous measurement of different measured quantities such as temperature, frequency, pressure, and magnetic field in the area of automotive or environmental measurement technology or the like. Such measurements are performed, for example, in a fuel injector of an engine of a motor vehicle in order to control the injector. A variety of sensors exist for individually measuring each of the parameters and are generally known to those skilled in the art. To simultaneously measure pressure, frequency, and magnetic field, the technique of providing separate sensors for each one of these parameters is known. The circuit boards provided for the variety of different sensors are each wired to an analysis device or control device, for example a microcontroller, for analysis of the measurement results. The variety of circuit boards to be provided and their wiring to the microcontroller, however, require a large amount of space, which is present only in limited amounts in a fuel injector of an internal combustion engine, for example.

A further problem is that the individual measurements affect one another in a close arrangement of the individual sensors, such as exists in a fuel injector or in many other measurement applications, so that the measurement results are undesirably distorted as a result. For example, an optimized measurement of pressure significantly decreases the accuracy of a magnetic field sensor used for magnetic field measurement.

SUMMARY OF THE INVENTION

It is therefore an object of the present invention to provide a single integrated sensor, in particular for temperature measurement, frequency measurement, pressure measurement, and magnetic field measurement, in which the individual measurements do not influence one another.

Accordingly, an integrated multisensor is provided, in particular for an internal combustion engine of a motor vehicle, having at least one pressure/temperature sensor, having at least one magnetic field sensor, and having a plurality of insulating wells, wherein a separate insulating well encloses each pressure/temperature sensor or magnetic field sensor such that the sensors are each electrically and mechanically decoupled from one another. A pressure/temperature sensor can be a pressure sensor to measure the pressure or a temperature sensor to measure the temperature or a sensor for measuring the pressure and the temperature.

In an embodiment, each individual sensor (pressure/temperature sensor, magnetic field sensor) of the integrated multisensor is surrounded with an insulating well so that a temperature measurement, a frequency measurement, a pressure measurement, and a magnetic field measurement are possible by the pressure and temperature sensor and the magnetic field sensor, without the individual measurements influencing one another in their measurement results. In accordance with the invention, a well or insulating well substantially completely surrounds an individual sensor at least on its sides and bottom. In this way, the decoupling of the individual measurements by the insulating wells makes it possible for the individual sensors to be integrated into an overall system (multisensor). Through the integration of the different individual sensors into a multisensor, it is possible to eliminate a variety of different individual boards. Space is advantageously saved in this way.

Moreover, costly individual wiring of the individual sensors is no longer necessary, since integration into an overall system is possible due to the use of the insulating wells for electrical and mechanical decoupling. This is also advantageous in terms of manufacturing and assembly, since the multisensor can be produced more economically in this way.

According to an embodiment of the invention, at least one of the insulating wells can be a silicon oxide well. This well-shaped insulating structure completely surrounds the corresponding sensor, i.e. in the lateral as well as the vertical direction of the semiconductor body, thus in its depth. The silicon oxide well can be implemented as an SOI (silicon on insulator) structure, for example. Embedding each one of the individual sensors in a silicon oxide well of an SOI (silicon on insulator) structure permits an especially advantageous electrical and mechanical decoupling of the individual sensors from one another. Other materials for the insulator well, such as $Si_3N_4$, SOD (silicon on diamond), SOG (silicon on glass), TEOS (tetraethoxysilane), low-K, high-K, or the like, are also possible.

According to a further embodiment of the invention, the magnetic field sensor can be a gate array magnetic field sensor (gate array) with a plurality of gate magnetic field sensors (gates) which form a horizontal and vertical measurement structure, so that a magnetic field that is to be measured can be represented in three dimensions. The design of the magnetic field sensor as a gate array of magnetic field sensors advantageously permits very precise measurement over a wide measurement range, which cannot be achieved by the individual Hall elements in wide use today. The gate array magnetic field sensor is thus constructed as a surface and depth matrix so that a position measurement of the magnetic field in the three coordinate planes (x, y, z axes) is made possible in both the vertical and horizontal directions. As a result of this division of axes, a precise determination of the direction of the magnetic field, and thus a reliable angular measurement of the magnetic field, is made possible. The surface and depth sizes of the gate array magnetic field sensor are advantageously scalable so that high degrees of freedom can be provided with respect to the requirements on the multisensor for dynamic range and precision.

According to another embodiment, a drive device is provided, which drives the pressure/temperature sensor such that the pressure/temperature sensor can operate as an ultrasonic transmitter for wireless transmission of measured data from the multisensor. The use of the pressure/temperature sensor as an ultrasonic transmitter advantageously makes it possible to do away with a transmitter provided specifically for transmitting the measured data from the multisensor. This saves space within the multisensor as well as cost. In addition, the overall size of the multisensor is reduced as a result.

According to another embodiment, at least one cooling channel is provided for cooling the multisensor. As a result of the provision of the cooling channels, the circulation of a coolant for cooling the multisensor is advantageously ensured, even under the effects of high temperature.

According to another further embodiment, in an arrangement of the multisensor in the engine of a motor vehicle, fuel flows through the at least one cooling channel so that the multisensor is cooled by the fuel flowing through it. Temperatures of several hundred degrees Celsius are present in the interior of an engine of a motor vehicle; consequently, the circulation of the fuel, which as a rule has a temperature of approximately 10° to 40° Celsius, also cools the multisensor.

According to another embodiment, a plurality of metal contacts can be provided, wherein one metal contact electrically contacts one pressure/temperature sensor or one magnetic field sensor. The metal contacts can be made of, for example, aluminum or copper, and each one permits the electrical connection of the individual sensors to an electronic control unit of the multisensor.

According to another embodiment, at least one magnetic field sensor can be a Hall sensor or can be constructed with at least two PIN semiconductor diodes.

According to a further embodiment, a calibration device with a light-emitting diode section for calibrating the at least one magnetic field sensor can be provided. In this way, the system properties of the magnetic field sensor or magnetic field sensors can advantageously be corrected in operation of the multisensor through the electron emission of the light-emitting diode so that long-term stability can be achieved and aging effects can be excluded.

According to another embodiment, the pressure/temperature sensor can have a polysilicon membrane, and/or a reference membrane, and/or a tungsten plate for supporting and contacting the polysilicon membrane, and/or acoustic holes. In particular, establishment of contact through the tungsten plate in the SOI (silicon on insulator) structure permits the multisensor to be used in a high-temperature region, in a high pressure region, and thus in the environmental measurement and automotive fields.

According to another embodiment, a plurality of pressure/temperature sensors can be provided, which are arranged, for example, concentrically so that different pressure ranges can be measured. For example, when three concentrically arranged pressure/temperature sensors are provided, three differentiated measurement ranges of 1 to 10 bar, 10 to 100 bar, and >300 bar can be provided.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
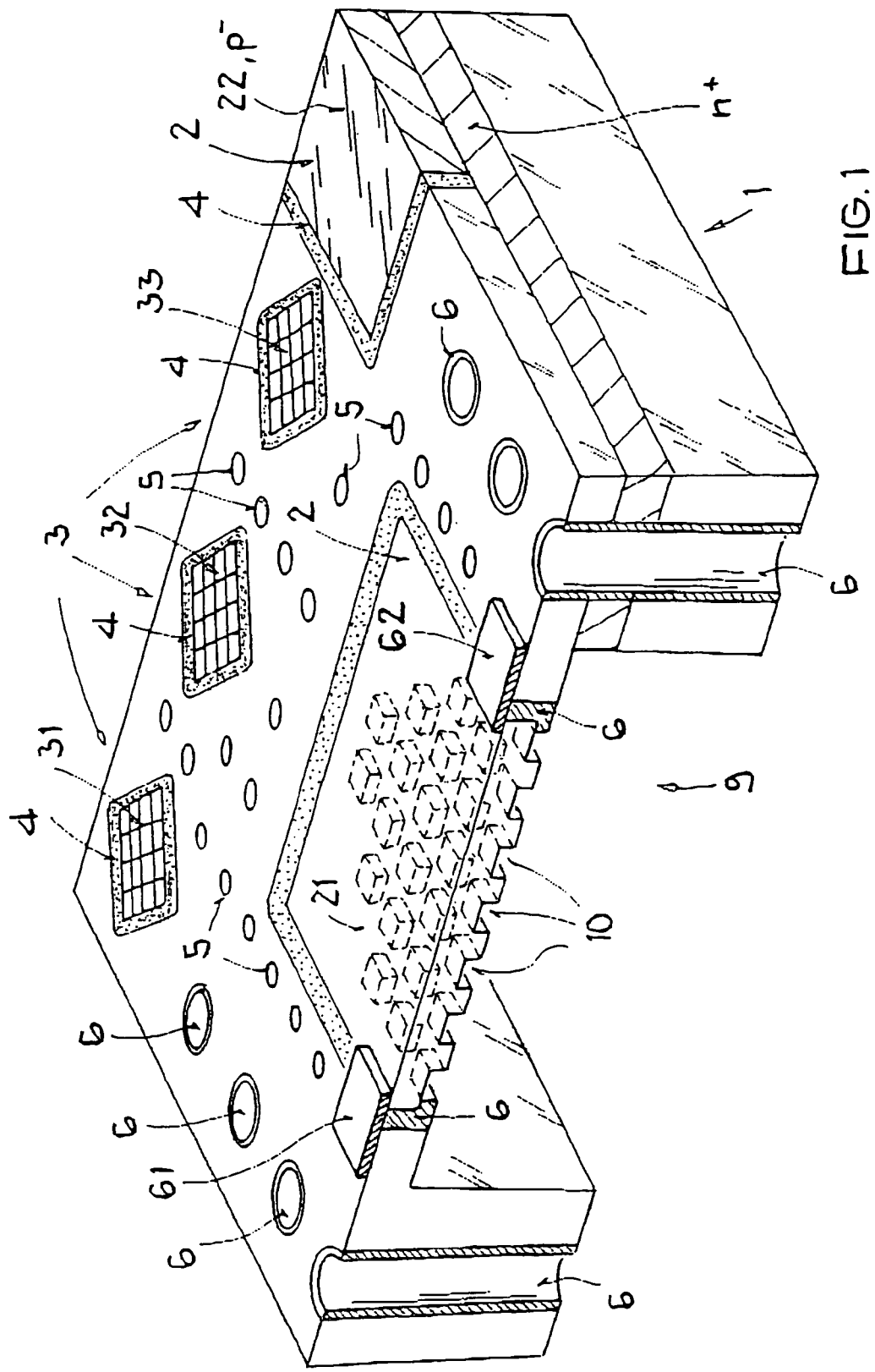
FIG. 1 is a schematic cross-sectional view of a first example embodiment of the multisensor.

In the drawings, like or functionally like elements and signals are identified with the same reference labels, unless otherwise specified.

FIG. 1 shows a schematic view of a first example embodiment of a multisensor 1. The integrated multisensor 1 is structured by a basic SOI (silicon on insulator) process. The integrated multisensor 1 has a first pressure/temperature sensor 21, a second pressure/temperature sensor 22, a first magnetic field sensor 31, a second magnetic field sensor 32, and a third magnetic field sensor 33. Each individual sensor 21, 22, 31, 32, 33 is surrounded by an insulating well 4 such that the individual sensors 21, 22, 31, 32, 33 are each electrically and mechanically decoupled from one another. Preferably the majority of insulating wells take the form of individual silicon oxide wells.

In addition, the multisensor 1 has a drive device (not shown), which drives the pressure/temperature sensor 2 such that the pressure/temperature sensor 2 operates as an ultrasonic transmitter for wireless transmission of measured data from the multisensor 1. The reference symbol 9 identifies the resonance area of the first pressure/temperature sensor 21.

For example, the pressure/temperature sensor 21 has acoustic holes 10, through which a medium to be measured can be directed to a reference membrane 8 (see also FIG. 2) of the pressure/temperature sensor 21.

In addition, the multisensor 1 preferably has a plurality of cooling channels 5 for cooling the multisensor 1. For example, in an arrangement of the multisensor 1 in an internal combustion engine of a motor vehicle, fuel flows through the cooling channels 5 so that the fuel flowing through cools the multisensor 1. Furthermore, other mediums may be utilized for cooling the multisensor 1 via the cooling channels 5.

In addition, the multisensor 1 has a plurality of metal contacts 6, where one metal contact 6 electrically contacts a pressure/temperature sensor 2 or a magnetic field sensor 3.

In addition, the multisensor 1 has a first metal connection 61 and a second metal connection 62, between which the first pressure/temperature sensor 21 can be driven by the drive device (not shown) through additional metal contacts 6. Similar considerations apply to all other individual sensors 2; 21-22; 3; 31-36 provided.

Preferably, the magnetic field sensors 3; 31, 32, 33 are each embodied as a Hall sensor or constructed from at least two PIN semiconductor diodes.

In addition, a calibration device (not shown) with a light-emitting diode section for calibrating the magnetic field sensors 3; 31, 32, 33 is preferably provided. By means of the calibration device, long-term stability of the multisensor 1 can be achieved and aging effects on the components of the magnetic field sensors 3; 31, 32, 33 can be excluded.

The magnetic field sensor 3 is preferably designed as a gate array magnetic field sensor with a plurality of gate magnetic field sensors 31, 32, 33; 31, 34, 35, 36 (see FIG. 2), which form a horizontal and vertical measurement structure, so that a magnetic field H to be measured can be represented in three dimensions.

Figure 2:
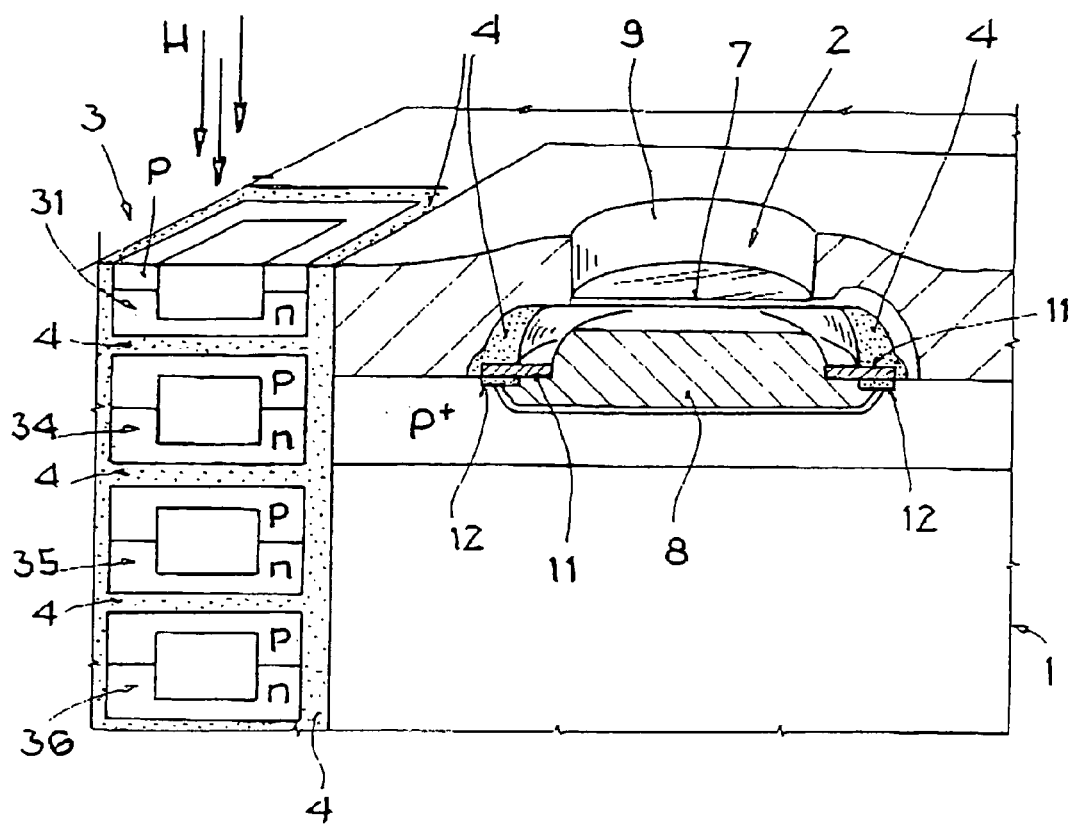
FIG. 2 is a schematic cross-sectional view of the layer structure of a second example embodiment of the multisensor.

To this end, FIG. 2 shows a schematic cross-sectional view of the layer structure of a second preferred example embodiment of the inventive multisensor 1. In this regard, the left side of FIG. 2 shows the magnetic field sensor 3, embodied as a gate array magnetic field sensor with the vertical measurement structure of the gate magnetic field sensors 31, 34, 35, 36, each of which is surrounded by an insulating well 4.

In the right-hand half of FIG. 2, a detailed representation of a pressure/temperature sensor 2 is shown. The magnetic field sensor 3 and the pressure/temperature sensor 2 are likewise electrically and mechanically decoupled by a wall of an insulating well 4. The pressure/temperature sensor 2 has a polysilicon membrane 7 for pressure, frequency, and temperature measurement. The oscillation of the polysilicon membrane 7 is measured relative to a reference membrane 8. In addition, a tungsten plate 11 is provided within the pressure/temperature sensor 2 to support and contact the polysilicon membrane 7. An insulating layer 12 is provided between a $p^+$-doped silicon layer of the SOI base and the tungsten plate 11 for insulation.

Figure 3:
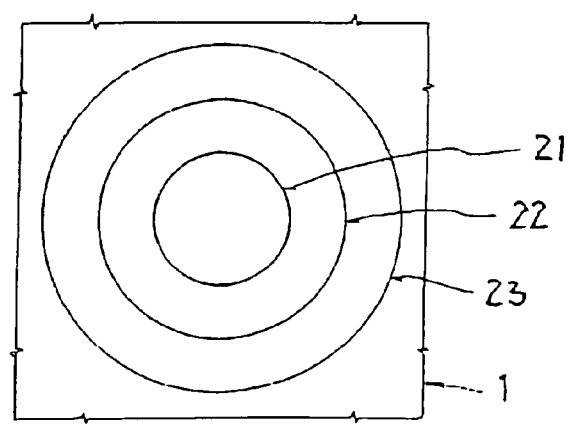
FIG. 3 is a schematic top view of a concentric arrangement of a plurality of pressure/temperature sensors according to a third example embodiment of the multisensor.

FIG. 3 shows a schematic top view of a concentric arrangement of a plurality of pressure/temperature sensors 21, 22, 23 according to a third example embodiment of the multisensor 1. Magnetic field sensors 3 are not depicted in FIG. 3. The first pressure/sensor 21, the second pressure/temperature sensor 22, and the third pressure/temperature sensor 23 are designed as concentric pressure lenses so that different pressure regions can be measured. For example, a measurement range of 1 to 10 bar can be measured with the first pressure/temperature sensor 21, a measurement range of 10 to 100 bar can be measured with the second pressure/temperature sensor 22, and a measurement range of greater than 300 bar can be measured with the third pressure/temperature sensor 23.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A multisensor comprising:
   at least one pressure/temperature sensor;
   at least one magnetic field sensor; and
   a plurality of insulating wells, each of the insulating wells enclosing each pressure/temperature sensor or magnetic field sensor such that the sensors are each electrically and mechanically decoupled from one another.

2. The multisensor according to claim 1, wherein at least one of the insulating wells is a silicon oxide well.

3. The multisensor according to claim 1, wherein the magnetic field sensor is designed a gate array magnetic field sensor with a plurality of gate magnetic field sensors, which form a horizontal and vertical measurement structure, by which a magnetic field that is to be measured can be represented in three dimensions.

4. The multisensor according to claim 1, further comprising a drive device for driving the pressure/temperature sensor such that the pressure/temperature sensor operates as an ultrasonic transmitter for wireless transmission of measured data from the multisensor.

5. The multisensor according to claim 1, further comprising at least one cooling channel for cooling the multisensor.

6. The multisensor according to claim 5, wherein the multisensor is arranged in an engine of a motor vehicle and fuel for operating the motor vehicle flows through the at least one cooling channel, and wherein the multisensor is cooled by the fuel flowing through it.

7. The multisensor according to claim 1, further comprising a plurality of metal contacts, wherein a metal contact electrically contacts one pressure/temperature sensor or one magnetic field sensor.

8. The multisensor according to claim 1, wherein the at least one magnetic field sensor is a Hall sensor or is constructed with at least two PIN semiconductor diodes.

9. The multisensor according to claim 1, further comprising a calibration device with a light-emitting diode section for calibrating the at least one magnetic field sensor.

10. The multisensor according claim 1, wherein the at least one pressure/temperature sensor has a polysilicon membrane, and/or a reference membrane, and/or a tungsten plate for supporting and contacting a membrane, and/or acoustic holes.

11. The multisensor according to claim 1, wherein a plurality of pressure/temperature sensors are provided and are arranged concentrically for measuring different pressure ranges.

12. The multisensor according to claim 1, wherein the multisensor is a multisensor for an internal combustion engine of a motor vehicle.

13. The multisensor according to claim 1, wherein, each of the insulating wells are separate from one another.

14. The multisensor according to claim 5, wherein fuel, air, or a liquid coolant flows through the cooling channel for facilitating cooling of the multisensor.

15. A fuel injector comprising a multisensor component having a plurality of sensors formed thereon, the plurality of sensors being electrically and mechanically decoupled from one another by insulating wells that insulate the plurality of sensors from one another, the plurality of sensors providing measurement values for at least a temperature measurement, a pressure measurement, and a magnetic field measurement.

16. The fuel injector according to claim 15, wherein the plurality of sensors further provide measurement values for a frequency measurement.

17. The fuel injector according to claim 15, wherein one of the plurality of sensors for the pressure measurement or the temperature measurement is driven by a drive device to transmit the measurement values wirelessly.

18. The fuel injector according to claim 17, wherein the measurement values are transmitted ultrasonically.

19. The fuel injector according to claim 15, wherein the multisensor has a resonance area formed therein for facilitating ultrasonic wireless transmission by one of the plurality of sensors.

* * * * *